(12) United States Patent
Kenington

(10) Patent No.: US 7,715,811 B2
(45) Date of Patent: May 11, 2010

(54) INTEGRATED TRANSCEIVER WITH ENVELOPE TRACKING

(75) Inventor: Peter Blakeborough Kenington, Chepstow (GB)

(73) Assignee: Andrew LLC, Hickory, NC (US)

( * ) Notice: Subject to any disclaimer, the term of this patent is extended or adjusted under 35 U.S.C. 154(b) by 3 days.

(21) Appl. No.: 12/257,944

(22) Filed: Oct. 24, 2008

(65) Prior Publication Data
US 2009/0045872 A1    Feb. 19, 2009

Related U.S. Application Data

(62) Division of application No. 11/073,535, filed on Mar. 7, 2005.

(51) Int. Cl.
*H04B 1/04* (2006.01)
*H01Q 11/12* (2006.01)
*H03F 1/02* (2006.01)

(52) U.S. Cl. ............... 455/127.1; 455/114.3; 455/126; 330/127

(58) Field of Classification Search ............ 455/127.1, 455/127.2, 127.4, 114.3, 127.5, 114.2, 126, 455/67.11, 67.13, 194.2, 242.1, 242.2; 330/149, 330/136, 297, 10, 103, 199, 285; 375/297
See application file for complete search history.

(56) References Cited

U.S. PATENT DOCUMENTS

| | | | |
|---|---|---|---|
| 5,420,536 A | 5/1995 | Faulkner | |
| 6,141,541 A | 10/2000 | Midya et al. | |
| 6,160,449 A * | 12/2000 | Klomsdorf et al. | 330/149 |
| 6,240,278 B1 | 5/2001 | Midya | |
| 6,646,501 B1 | 11/2003 | Wessel | |
| 6,774,719 B1 | 8/2004 | Wessel et al. | |
| 6,788,151 B2 | 9/2004 | Shvarts et al. | |
| 6,794,931 B2 * | 9/2004 | Kenington | 330/10 |
| 6,853,246 B2 | 2/2005 | Bauder et al. | |
| 7,023,273 B2 * | 4/2006 | Johnson et al. | 330/149 |
| 7,043,213 B2 * | 5/2006 | Robinson et al. | 455/127.2 |

(Continued)

FOREIGN PATENT DOCUMENTS

GB    2338130    12/1999

(Continued)

OTHER PUBLICATIONS

Slim Boumaiza et al., Implementation of an Adaptive Digital/RF Predistorter using direct LUT Synthesis, Conference: 2004 IEEE MITT-S International Microwave Symposium Digest, pp. 681-684.

(Continued)

*Primary Examiner*—Pablo N Tran
(74) *Attorney, Agent, or Firm*—Wood, Herron & Evans, LLP

(57) ABSTRACT

A transceiver comprises an amplifying circuit for amplifying an input signal to produce an output signal. A power supply is operable for varying the level of power supplied to the amplifying circuit in response to variation of an input signal envelope directed to the power supply. A processing circuit is operable for digitally detecting the input signal envelope to provide variation of the power supply level. The processing circuit is further operable for digitally delaying the digital input signal envelope to time align the power supply level with the input signal.

10 Claims, 5 Drawing Sheets

U.S. PATENT DOCUMENTS

| | | | |
|---|---|---|---|
| 7,058,369 B1 * | 6/2006 | Wright et al. | 455/114.2 |
| 7,062,236 B2 * | 6/2006 | Midtgaard et al. | 455/126 |
| 7,183,847 B2 | 2/2007 | Suzuki | |
| 7,200,367 B1 * | 4/2007 | Wright et al. | 455/91 |
| 7,339,426 B2 * | 3/2008 | Gurvich et al. | 330/136 |
| 2003/0198300 A1 | 10/2003 | Matero et al. | |

FOREIGN PATENT DOCUMENTS

| | | |
|---|---|---|
| GB | 2345212 | 6/2000 |

OTHER PUBLICATIONS

Dale R. Anderson et al., High-Efficiency High-Level Modulator for use in Dynamic Envelope Tracking CDMA RF Power Amplifiers, Conference: 2001 IEEE MTT-S International Microwave Symposium Digest, pp. 1509-1512, & Fig. 9/10.

Pallab Midya et al, Tracking Power Converter for Supply Modulation of RF Power Amplifiers, Conference: 2001 IEEE 32nd Annual Power Electronics Specialists Conference, pp. 1540-1544.

Feipeng Wang et al., Envelope Tracking Power Amplifier with Pre-Distortion Linearization for WLAN 802.11g, Conference: 2004 IEEE MTT-S International Microwave Symposium Digest, pp. 1543-1546.

* cited by examiner

INTEGRATED TRANSCEIVER WITH ENVELOPE TRACKING

RELATED APPLICATIONS

This application is a divisional of U.S. Ser. No. 11/073,535, filed Mar. 7, 2005, and entitled "AN INTEGRATED TRANSCEIVER WITH ENVELOPE TRACKING", which application is incorporated herein by reference in its entirety.

BACKGROUND OF THE INVENTION

In wireless communication applications, such as cellular phone services or other wireless services, amplifiers are used to provide the desired signal coverage for the particular wireless application. For example, radio frequency (RF) power amplifiers are used for boosting the level of an RF signal prior to transmission of that signal. RF power amplification techniques, and particularly RF power amplification techniques used for wireless applications, have inherent drawbacks to which the industry continues to direct its efforts. Specifically, in developing an RF transmission system, considerable attention is given to amplifier efficiency and signal distortion of the amplified signal.

Amplifier efficiency, which is generally defined as the level of RF power that may be achieved at the output signal compared to the power that is input into the overall amplification process, is conventionally somewhat low in wireless applications. Therefore, considerable attention within the power amplifier industry has been devoted to methods of enhancing power amplifier efficiency. Small increases in amplifier efficiency can provide significant benefits in a wireless system and reduce the overall costs necessary to run the system.

Another drawback in RF power amplification, which must be addressed and taken into account with any methods for improving efficiency, is signal distortion. An RF power amplifier, to a greater or lesser extent, exerts a distorting effect on the RF signals that are amplified. Non-linearities of the amplifier, as well as other factors, contribute to the distortion. Such distortion must be controlled to ensure that the RF transmitter meets the various standards regarding RF interference.

To address amplifier efficiency, one current technique involves the use of envelope tracking of the input signal to the amplifier and use of the detected envelope to vary the amplifier operation. In an envelope tracking system, a variable power supply is utilized for supplying power to the amplifier. The envelope power levels of the input signal are monitored, and the power that is supplied to the power amplifier, or typically to the final stage(s) of the power amplifier, is varied based on the monitored envelope levels. More specifically, the power that is supplied to the amplifier is varied so as to be just sufficient to reproduce the power level required by the amplifier at a given instant of time. Therefore, at low envelope power levels, a low supply voltage is provided to the amplifier, and the full supply voltage is provided to the amplifier only when the maximum power is required, that is, at the envelope peaks.

However, while envelope-tracking techniques improve efficiency, it is desirable to improve upon envelope tracking features. Particularly, it is desirable to improve upon and efficiently incorporate an envelope tracking power supply into a transceiver. Furthermore, it is desirable to improve upon the efficiency and linearity of an RF power amplifier, in a transceiver system. Still further, it is desirable to utilize the digital signal processing capabilities of a transceiver for implementing envelope tracking capabilities. It is further desirable to implement such features of envelope tracking while addressing imperfections or non-linearities in the tracking behavior of the power supply,

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION

The present invention addresses the above-noted drawbacks in the prior art, and specifically addresses the utilization of an envelope tracking power supply in a transceiver. Specifically, the present invention utilizes digital signal processing within a transceiver to perform envelope extraction and provide appropriate Delay matching of the envelope and main signal paths. In another embodiment, predistortion of the envelope signal is utilized to address non-linearities in the envelope tracking power supply.

Figure 1:
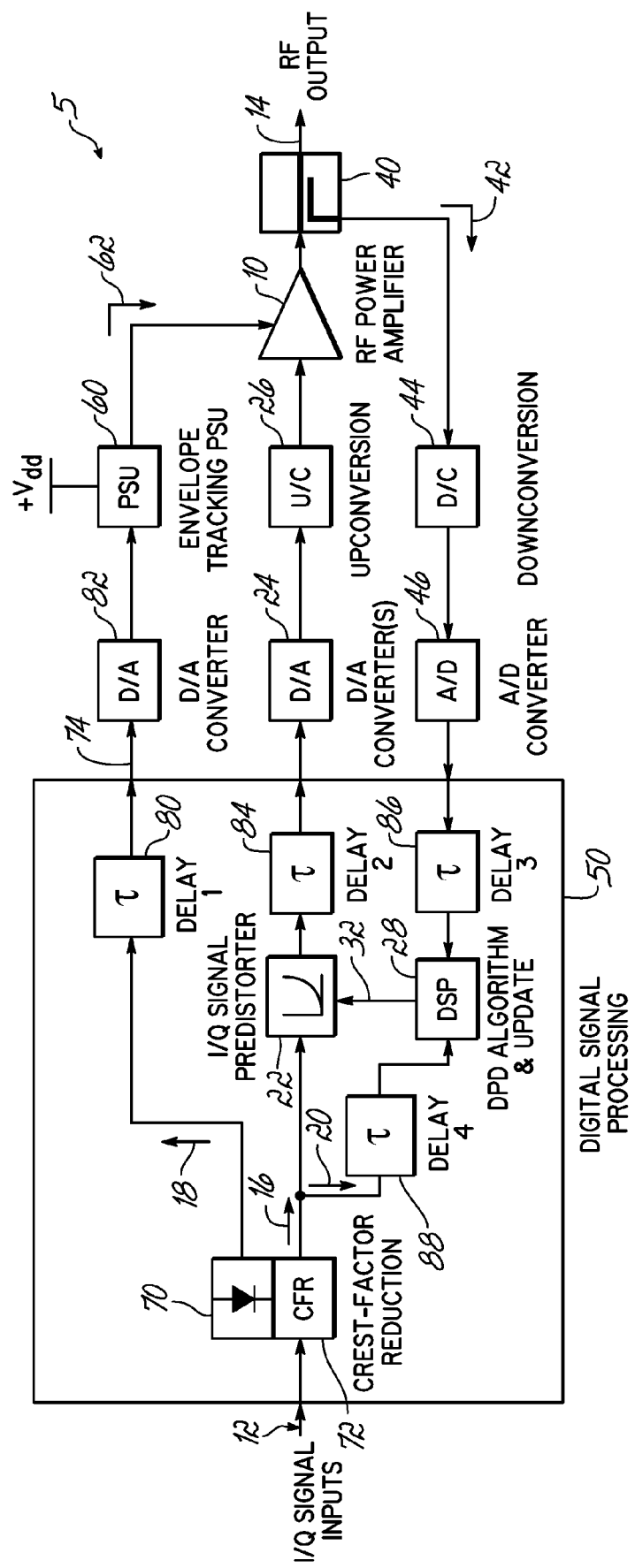
FIG. 1 illustrates an embodiment of the present invention or an envelope-tracking power amplifier in a transceiver.

FIG. 1 illustrates one embodiment of the present invention utilized to improve the performance, efficiency and cost-effectiveness of a transceiver system. For example, referring to FIG. 1, the overall transceiver system, or transceiver 5, includes an amplification device or amplifier 10, such as an RF power amplifier that produces an RF output signal 14 in response to an input signal 12. The input signal 12 is a digital signal that is processed by the DSP 50, converted to analog and then appropriately upconverted to RF prior to amplification by amplifier 10. The power amplifier 10 may be a single stage or multiple stage amplifier of a suitable variety for RF power amplification. In the transceiver 5 illustrated in FIG. 1, generally the input signal 12 is directed along several different paths for realizing the various aspects of the invention. For the purposes of discussion herein, only the transmit side of the transceiver 5 is illustrated. However, a person of ordinary skill in the art will realize that a receiver path is also generally part of a transceiver.

The input signal 12 is directed along a main signal path (MSP) 16 to be amplified by amplifier 10. The input signal 12 is also coupled to an envelope-tracking path 18 and is coupled to a signal processing path 20 in FIG. 1. Along the MSP 16, input signal 12 proceeds to the input of amplifier 10, where it is amplified and produced as an output signal 14. In the MSP, the input signal may be further processed for improving the operation of the RF power amplifier. For example, as shown in FIG. 1, a signal in the MSP 16 may be predistorted, either digitally or in an analog fashion, to address non-linearities in the power amplifier 10, according to known predistortion principles. Of course, other linearization techniques might also be utilized along the MSP to address non-linearities in the amplifier 10. For the purposes of illustrating one embodiment of the present invention, the predistortion of the input signal along the MSP 16 is disclosed in the Figures as digital predistortion and various digital predistortion techniques may be used. However, it would be understood by a person of ordinary skill in the art, that various other linearization techniques, digital or analog, might be utilized along the MSP 16 for addressing amplifier non-linearities and distortion and for enhancing the performance of power amplifier 10. The present invention is thus not limited to the linearity techniques or predistortion techniques of the MSP that are illustrated or specifically discussed.

Referring again to FIG. 1, the input signal or signals 12 are shown in a digital form as quadrature I/Q signals, which, along the MSP 16, are directed to a predistortion circuit incorporated in the DSP 50 that includes predistorter 22 and algorithm/update circuitry 28. The predistorter 22 predistorts the input signal 12, whereupon the predistorted input signal is converted to an analog signal by a D/A converter 24 and upconverted from baseband to RF by upconversion circuitry 26. The RF signal is then amplified by the RF power amplifier 10 to produce analog RF output signal 14.

A digital predistorter 22, which may be a lookup table (LUT) circuit, for example, will generally include additional digital signal processing (DSP) circuitry 28, which includes signal processing circuitry for implementing the digital predistortion algorithm, and any updating or adaptation of the predistortion circuit. For example, if look-up table (LUT) predistortion is used, the LUTs of predistorter 22 may need to be adaptively populated and updated, which may be handled by the DSP 28. Furthermore, any correction or updates to the predistortion is handled by the DSP 28.

Generally, according to known LUT predistortion principles, the I/Q input signals 12 are directed via path 20 to the DSP 28 and are utilized to drive the predistortion process. For example, the DSP 28, via path 32, may utilize the values of the I/Q input signals to index and look up corresponding predistortion I/Q values in the respective LUTs. DSP 28 can also be utilized to adaptively update the values of the LUTs in predistorter 22, or to provide additional correction algorithms through the predistorter 22 according to known digital predistortion techniques.

Referring to FIG. 1, a coupler 40 might be utilized to couple a portion of the analog output signal 14 to DSP 28 as a feedback signal along feedback path 42, which includes appropriate downconversion circuitry 44 and A/D conversion circuitry 46. DSP 28 utilizes the output feedback signal on path 42 to adapt the predistorter 22 based upon the knowledge of the performance of the predistortion that is provided by that feedback signal 42. Generally, digital predistortion circuits 22 and the supporting DSP 28 will all be incorporated together within a larger overall DSP circuit or block indicated by reference numeral 50 in FIG. 1. However, separate blocks or circuits might also be utilized. Accordingly, the present invention is not limited to specific layouts or positions of the DSP blocks, which handle the predistortion and/or the adaptation of the predistortion, as well as the timing alignment of the various signals of the transceiver. Furthermore, as discussed further below, a delay element 86 (Delay 3) is incorporated into feedback path 42 for correlating the predistortion updating and predistortion algorithm with the input signal 12.

In the present invention, an envelope-tracking power supply 60 is utilized and is coupled to power amplifier 10 for supplying power to the amplifier via path 62. As noted above, in an envelope-tracking power supply, the power supply 60 is operable for tracking the input signal envelope, derived from path 18 in order to vary the level of power supplied to the amplifier 10 in response to variation of the input signal envelope. More specifically, the power supplied to amplifier 10 via power supply 60 is varied so as to be sufficient to reproduce, at the amplifier output 14, the power level required at a given instant. Therefore, at low envelope power levels, a low supply voltage is provided to amplifier 10. A full supply voltage is only provided when maximum envelope power is required, such as at the envelope peaks of the input signal.

Referring again to FIG. 1, the present invention utilizes envelope tracking to improve the operation of the transceiver and specifically to improve the operation and efficiency of amplifier 10. The invention incorporates digital envelope detection from a digital envelope detector 70. Digital envelope detector 70 may be a stand-alone function in the DSP 50, or it may be incorporated into other digital signal processing features of the DSP of transceiver 5.

The present invention exploits the superior capabilities of the digital signal processing within a transceiver to perform the envelope extraction and modulation functions for the envelope tracking power supply 60. Furthermore, the invention utilizes the digital signal processing functions of the transceiver to achieve suitable envelope tracking advantages by providing the appropriate timing and delay matching of the envelope tracking and main signal paths.

More specifically, in one embodiment, the transceiver 5 utilizes digital signal processing block 50 to achieve peak-to-average signal reduction, such as crest factor reduction (CFR) 72. The CFR 72 uses envelope detection. The transceiver 5 utilizes the digital envelope detection function 70 of the CFR function 72 for the purposes of incorporating an envelope-tracking PSU 60. In that way, the digital envelope detection functionality 70 of the transceiver may be incorporated for various different purposes, including envelope tracking, providing an overall efficiency improvement and lower cost in the design of the DSP block 50 of the transceiver, while providing the power efficiency of envelope tracking.

The input signal 12 is coupled from the MSP 16 onto path 18 where it is directed to digital envelope detector 70, which is shown as part of the CFR function. Because the input signal envelope is utilized for the purposes of an envelope-tracking power supply, the digital signal processing (DSP) block 50 utilizes digital envelope detector 70 to extract magnitude information of the input signal with respect to envelope detection. For example, one type of envelope detector is noted by the relationship:

$$env = \sqrt{I^2 + Q^2}$$

Utilizing the detected envelope, the DSP block 50 provides an envelope signal 74 to PSU 60. The PSU 60 then uses the envelope signal 74 to drive the PSU 60 and thereby output a signal on path 62 that meets the power requirements of power amplifier 10.

In accordance with another aspect of the present invention, DSP block 50 of transceiver 5 provides precise timing control of the signals in the system by accurately matching the delays between the envelope tracking 18 and main signal paths 16 to ensure that the envelope-varying supply voltage 62 has the correct timing alignment with the input signal to the amplifier 10. The present invention thus provides an efficient, cost-effective DSP implementation of timing control in a transceiver utilizing an envelope-tracking amplifier.

In the prior art, such timing alignment for the purposes of an envelope tracking PSU 60 would otherwise require significant lengths of co-axial cable or expensive delay filters in order to achieve the required alignment. The present invention eliminates such bulky and expensive components and provides a transceiver that incorporates envelope tracking capabilities and timing alignment features all in the same DSP block 50.

Referring to FIG. 1, the DSP block 50 incorporates a number of delays within the main signal path 16, the envelope-tracking path 18 and the processing paths 20 and 42. The DSP block 50 ensures that PSU 60 provides appropriate power to the amplifier 10 to coincide with peaks in the envelope of the input signal 12. Furthermore, the DSP provides proper alignment in the digital predistortion algorithm of block 28 to ensure that the proper correction is provided via predistortion from predistorter 22 for a correlated input signal 12.

More specifically, in the envelope detection path 18, DSP block 50 incorporates a delay element 80 referred to as Delay 1. Digital-to-analog converter 82 is also utilized to convert the digitally detected envelope signal from Delay 1 into an appropriate analog signal for use by PSU 60. Another delay element 84, also referred to herein as Delay 2, is provided in the main signal path 16. Delay 1 and Delay 2 are utilized to provide correlation between the peaks of the input signal 12 and the power signal 62 provided to amplifier 10 by PSU 60. This provides sufficient power to the amplifier 10 to handle input signal peaks. While the embodiment illustrated in FIG. 1 shows two delay elements (Delay 1, Delay 2), it may be suitable to utilize only one delay element. For example, the inherent delay in the envelope-tracking path 18 may be significant due to the operation of the power supply and, thus, it may be suitable to eliminate Delay 1 and only utilize Delay 2. Alternatively, Delay 2 might be eliminated and only Delay one utilized. In one aspect of the invention, Delay 1 may provide fine-tuning of timing, whereas Delay 2 may provide a coarser delay control, or vice versa.

In another aspect of the present invention, a Delay element 86 is incorporated into a feedback path indicated by reference numeral 42. Delay component 86 is also referred to as Delay 3. A Delay element 88, also referred to as Delay 4, is incorporated into the processing path 20, which provides a portion of the input signal to DSP block 28 for driving the digital predistortion provided by predistorter 22.

In accordance with one aspect of the invention, DSP 50 provides digital implementation of Delay 3 and Delay 4 to provide correlation between the input signal 12 and the resulting amplified output signal 14 as they are provided as inputs to DSP block 28. This ensures that the predistorter 22 addresses the distortion in the output signal 14 that may be provided by the characteristics of amplifier 10. DSP block 50 of the transceiver 5 provides Delay elements 1-4 in FIG. 1 and provides adjustability of those elements for the purposes of implementing the precise timing control of the invention to ensure the proper operation of the envelope-tracking functions of the transceiver.

Specifically, in order to realize the delays provided by DSP block 50 in accordance with the principles of the present invention, calibration is utilized for the delays. First, in addressing the timing alignment in MSP 16 and envelope tracking path 18, Delay 2 is set in DSP 50. The amount of Delay 2 may be configured to be somewhat significant due to inherent signal delay provided within PSU 60. In one embodiment of the invention, the large Delay 2 might be determined empirically, such as on a lab bench, and then the initial delay preloaded into DSP 50. Delay 2 is preferably set to be slightly larger than the delay of the signal in the envelope tracking path 18, which includes Delay 1 (which can be 'fine adjusted' to equalize the delays in the two paths), D/A converter 82, and PSU 60. Next, after Delay 2 is initialized, Delay 3 and Delay 4 are set by DSP 50 to provide correlation at DSP block 28 for the predistorter 22.

Specifically, the envelope tracking features of DSP 50 and the transceiver 5 are disabled so that full power is provided to amplifier 10 through signal 62. Delay 4 may also be a significant delay. While DSP 50 may incorporate variable delays in both Delay 3 and Delay 4, in one embodiment, Delay 4 might be preset or initialized to take into account the delays of the main signal path 16 and feedback path 42, and then Delay 3 might be incrementally adjusted by DSP 50 to achieve timing alignment between the input signal in path 20 to the predistorter DSP block 28 and the feedback of the amplified output 14, which is coupled off and fed back on path 42. The delay of element Delay 4 would generally be equal to the delay associated with predistorter 22, Delay 2, D/A converter 24, upconverter 26, amplifier 10, coupler 40, downconverter 44, A/D converter 46, and Delay 3. For the purposes of calibrating Delay 3/Delay 4, the predistorter 22 does not need to be providing predistortion, whilst PSU 60 must not be tracking and must provide a high level or maximum level signal to the power amplifier 10. With a non-tracking power supply and an appropriate input signal 12, the DSP block 50 adjusts Delay 3 to provide correlation of the feedback signal 42 with the input signal 12 at the predistorter DSP block 28. Specifically, the input signal is amplified by amplifier 10, coupled, and then fed back in path 42 to DSP block 28. A portion of the input signal 12 is also coupled off on path 20 as an input to the DSP block 28. Delay 3 is adjusted by DSP 50 to provide timing alignment between the input signal and the resulting feedback of the amplified output. While Delay 3 is discussed herein as being the adjusted component with Delay 4 generally fixed by DSP 50, it may be that both Delay 3 and Delay 4 are adjusted by DSP 50 for the purpose of the timing alignment. Or, Delay 3 might be fixed and Delay 4 adjusted (or Delay 3 might be omitted and Delay 4 adjusted).

In the adjustment of Delay 3 and/or Delay 4, coarse delay adjustment may be provided by DSP 50 utilizing whole clock cycles, such as by the delays provided by shift registers or FIFO stacks, for example. Alternatively, DSP 50 might provide a fine delay adjustment incorporating fractions of clock cycles, such as with a variable delay filter. In one embodiment, a coarse delay adjustment might be provided by Delay 4 and a fine adjustment by Delay 3. In an alternative embodiment, coarse delay adjustment might be provided by Delay 3 with fine delay adjustment provided by Delay 4. In still another embodiment, only one delay element, Delay 3 or Delay 4, might be used and may provide both coarse and fine adjustment.

Once Delay 3 has been set in the above example, the system then runs providing predistortion and updates of DSP block 28 until a steady state condition is reached in the DSP 50 and the predistortion function.

After steady state is reached, Delay 1 and/or Delay 2 might be calibrated and adjusted utilizing DSP 50, but without a predistortion function. Specifically, for the purposes of calibrating Delay 1 and/or Delay 2, the predistortion function is fixed. For example, the LUTs might be fixed so that they are not updated from their condition as determined in the full power supply steady state condition after calibration of Delay 3 and Delay 4. Simultaneously with setting the predistortion function, the tracking functionality of envelope tracking PSU 60 is enabled. PSU 60 is then responsive to the detected envelope signal 74 for varying the power delivered to amplifier 10. That is, the power supply 60 tracks the input signal envelope. The DSP 50 then uses adjustments to Delay 1 and/or Delay 2 to align the input signal to amplifier 10 with the power supply signal 62.

When the signal 62 from PSU 60 to amplifier 10 does not track properly to provide maximum power corresponding with various peaks of the input signal 12 along the main signal path 16, distortion results in amplifier 10. The DSP block 50 tracks the distortion at amplifier 10, such as along path 42.

Since the predistortion is fixed and is not updated, the distortion in the output on path 42 is the result of misalignment between the envelope tracking signal 62 and the signal along the MSP 16. The DSP block 50 tracks a minimum in the distortion of output signal 14 and adjusts Delay 1 and/or Delay 2. In one embodiment, Delay 2 may provide coarse delay adjustments or may be fixed and Delay 1 may provide a fine delay adjustment between the output signal and the power signal 62 to amplifier 10 from PSU 60. In an alternative embodiment, Delay 1 may provide coarse adjustment or be fixed, while Delay 2 provides fine adjustment for the purposes of alignment. One of the delays might provide a coarse adjustment, including entire clock cycles (e.g., shift register, FIFO stack) or might utilize a fine delay adjustment such as provided by a variable delay filter to achieve delays that are fractions of a clock cycle.

In another embodiment of the invention, one of Delay 1 or Delay 2 might be eliminated entirely, wherein the other element would handle both coarse and fine adjustment for the purposes of timing alignment of the input signal to amplifier 10 and the power supply signal 62 to amplifier 10.

Once Delay 1 and/or Delay 2 has been adjusted to provide the desired alignment, the transceiver 5 runs in an appropriate fashion with the predistorter being regularly updated pursuant to feedback on path 42. Delay 1 might be periodically adjusted.

Figure 1A:
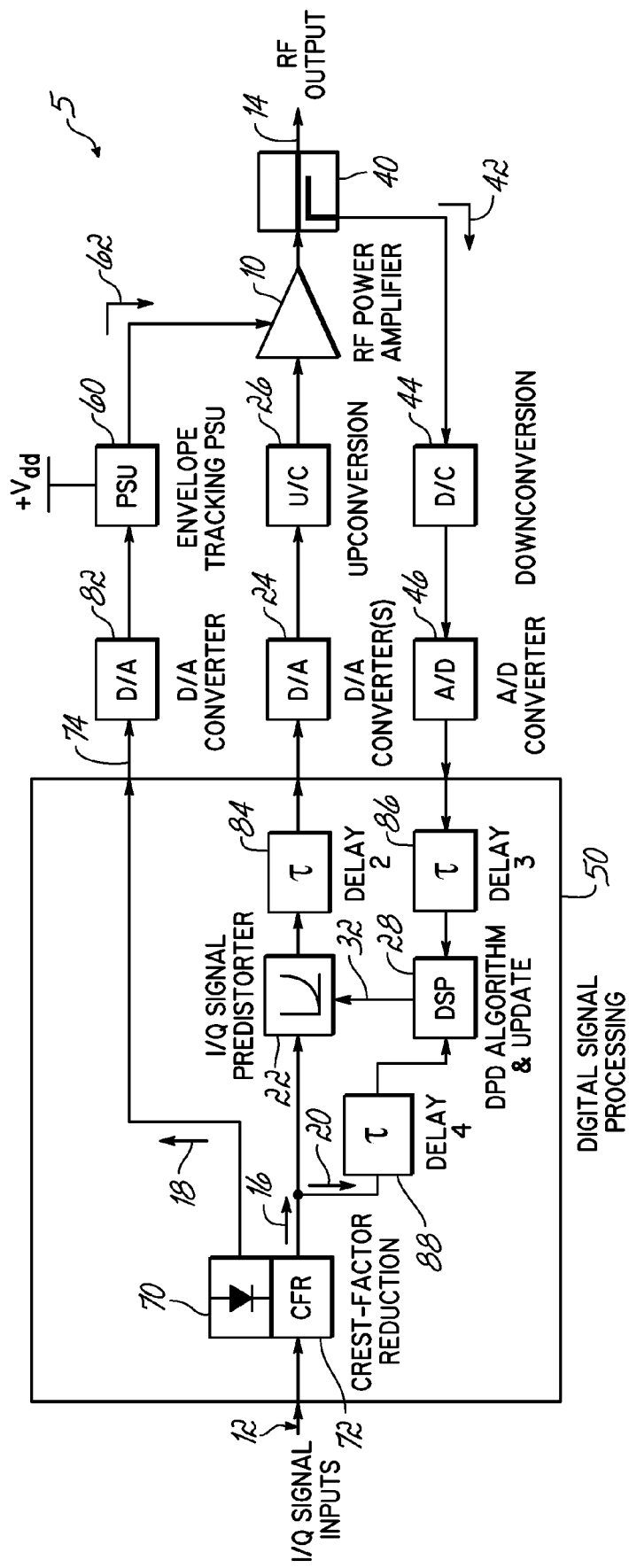
FIG. 1A illustrates an alternative embodiment of the present invention.
Figure 1B:
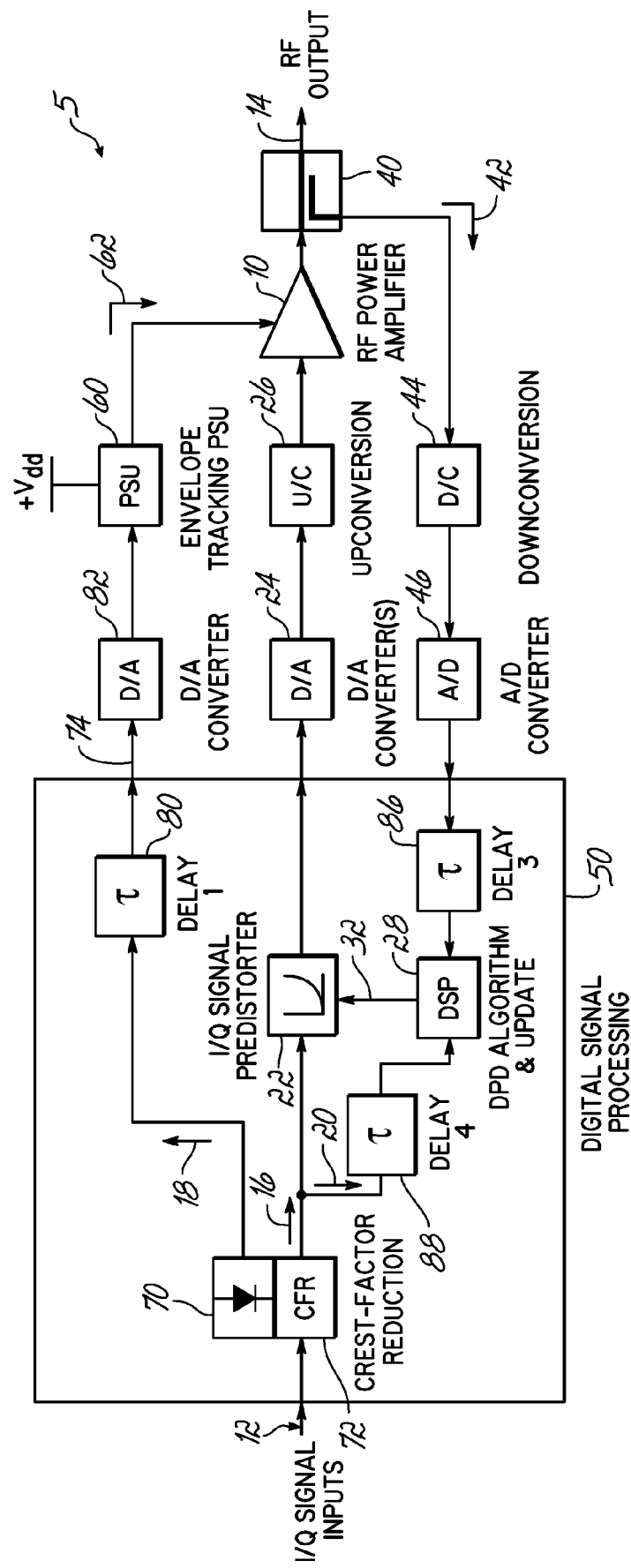
FIG. 1B illustrates another alternative embodiment of the present invention.

FIG. 1A illustrates another embodiment of the invention wherein the Delay 1 component has been removed and the Delay 2 component alone is utilized to align the signals in the envelope detection path 18 and the main signal path 16 at the amplifier 10. FIG. 1B illustrates an embodiment of the invention wherein the Delay 2 component has been removed to provide alignment adjustment primarily through Delay 1.

Figure 2:
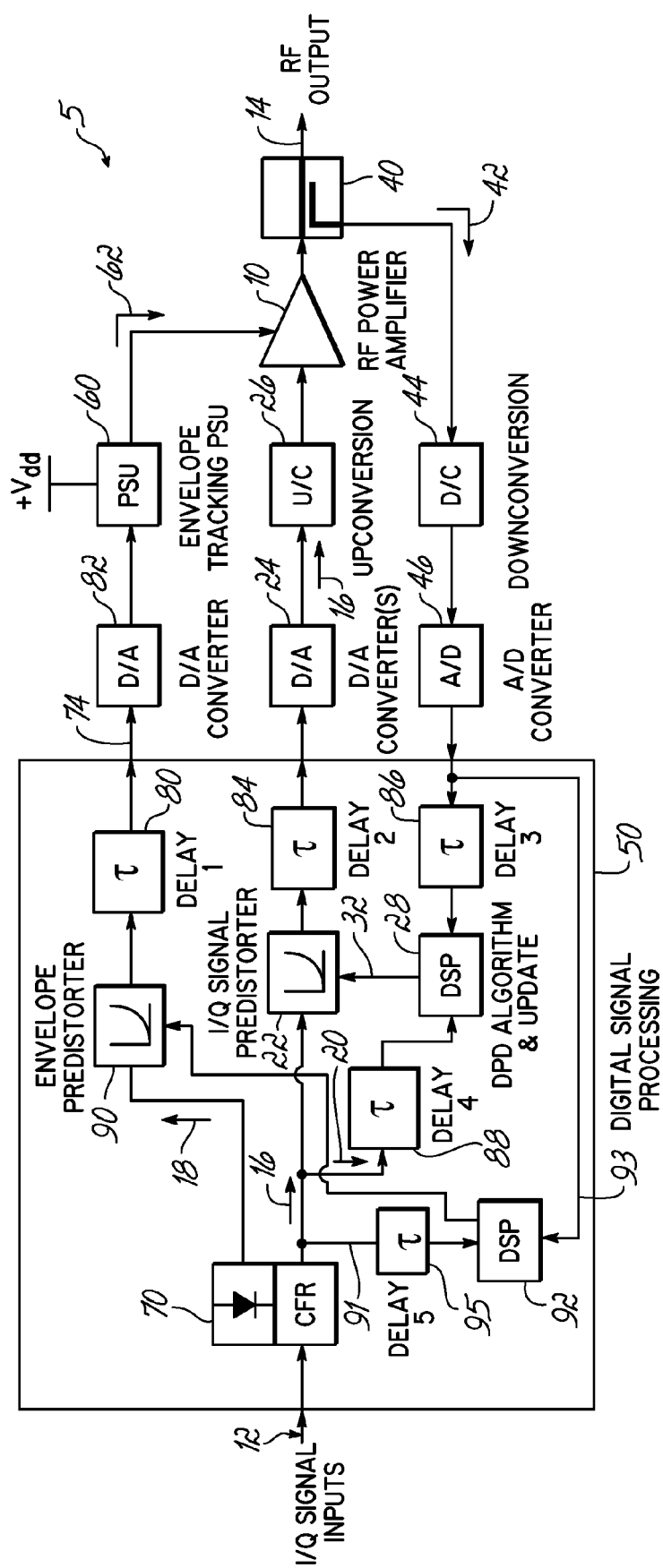
FIG. 2 illustrates an alternative embodiment of the circuit of FIG. 1 utilizing predistortion of an envelope signal.

FIG. 2 illustrates another embodiment of the invention wherein the DSP 50 incorporates a predistortion function or circuit 90 to predistort the envelope signal. The predistortion circuit 70 may provide any number of various suitable predistortion techniques to predistort the envelope signals 18 including, for example, an LUT predistorter. Similar to LUTs utilized for signal predistortion on the MSP, predistortion circuit 90 may be supported by DSP 92, utilized to execute the predistortion algorithm for the envelope predistortion and also to populate and/or update the LUTs of circuit 90 and to provide overall adaptation of the predistortion circuit 90 and its operation based upon the achieved output of power amplifier 10. To that end, the input signals 12 on path 91 are utilized by DSP 92 to implement the predistortion algorithm, such as to index and select LUT values in the example of an LUT predistorter. Similarly, the amplifier output 14 that is fed back on path 42 and path 93 is also utilized by DSP 92 for updating, correcting, and adapting predistorter circuit 90. DSP circuit 92, which operates in conjunction with the predistortion circuit 90, may also implement an envelope detector (not shown) in the respective input line 91 for the purpose of utilizing the detected envelope to drive the predistortion generation process. For the envelope predistortion, the detected envelope associated with line 18 is utilized to drive the predistortion process of circuit 90. If an LUT predistortion is utilized, a stream of digital samples of the envelope is fed to DSP 92 that operates on the envelope signals (e.g. $env=\sqrt{I^2+Q^2}$) and provides desired driving signals for the predistorter 90. Signals 91 and 93 input to the DSP 92 are converted to their respective envelopes before processing by DSP 92.

Figure 2A:
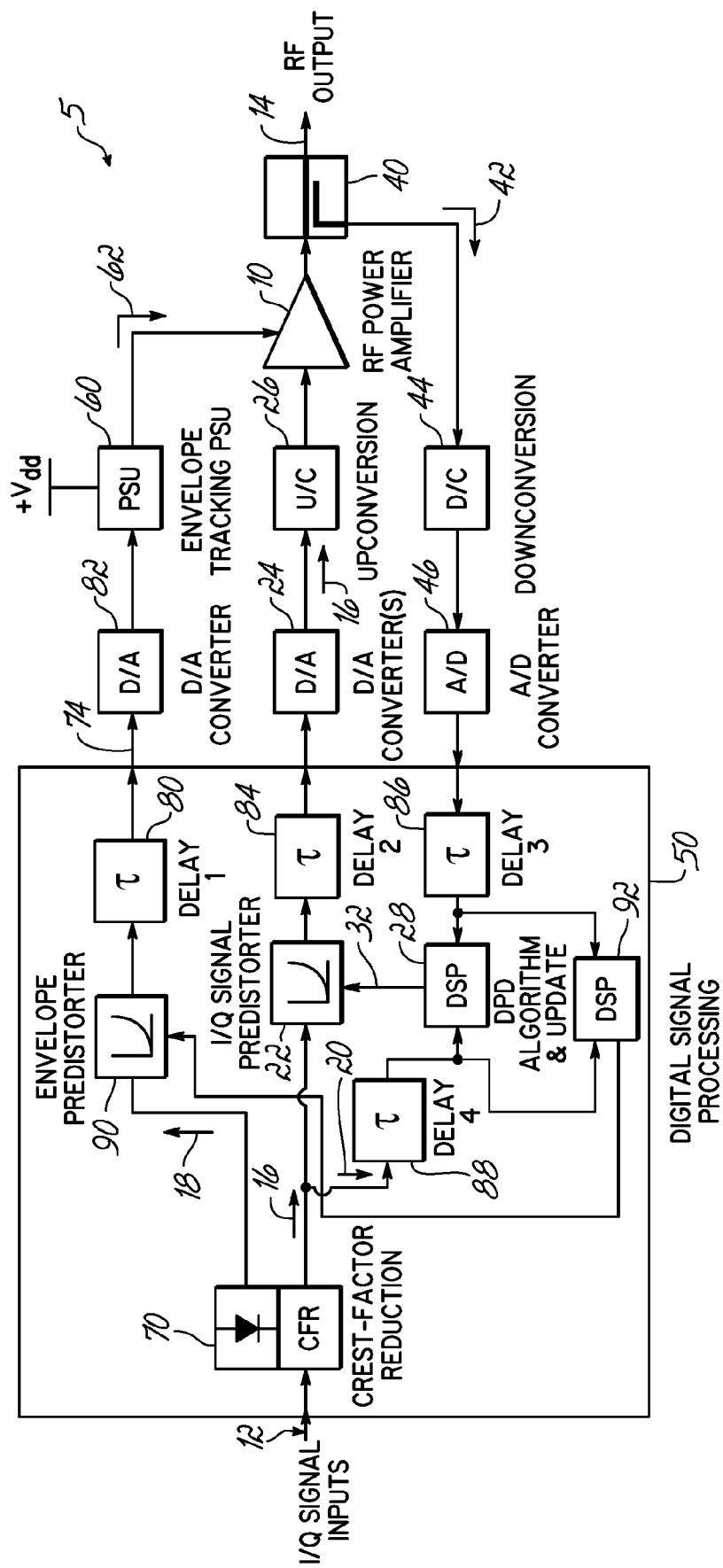
FIG. 2A illustrates another alternative embodiment of the circuit of FIG. 1 utilizing predistortion of an envelope signal.

The corrected or predistorted envelope signal on line 74 is then converted by D/A converter 82 to an appropriate analog signal for utilization by the envelope-tracking PSU 60. Specifically, the predistorted envelope signal feeds the envelope modulation input of the envelope-tracking power supply 60 to thus ensure that the output voltage on line 62 provides adequate tracking of the input signal envelope on line 18. A delay element 95 or Delay 5 in path 91 is used to equalize the delays to DSP 92 in the embodiment of FIG. 2. In another embodiment as illustrated in FIG. 2A, the inputs to the DSP 92 are the same as those to DSP 28 as shown. In such an embodiment, the DSP 92 performs the appropriate envelope detection on the signals of paths 20 and 42 prior to further processing by the DSP 92.

In one aspect of the invention, the predistortion circuit 90 is configured and operable for predistorting the input signal envelope to address the input signal tracking capabilities of the power supply. The predistortion addresses the operational parameters of power supply 60, such as the non-linearities in the transfer function of the power supply and addresses other imperfections in the tracking behavior of power supply 60, such as slew rate limitations, for example.

The predistortion circuit 90 may be configured to provide any desired predistortion of envelope signal 18 in order to offset the effects of the power supply 60. In one aspect of the invention, the predistortion will be a variation from ordinary MSP predistortion. For example, in MSP predistortion, even order components are usually set to zero to correct the intermodulation distortion (IMD) created by the odd order components in the amplifier transfer characteristic. For the envelope predistorter, however, even order components are also utilized and considered. For example, using an LUT predistorter for the envelope predistortion, both odd and even order components are generated. The same holds true if polynomial predistortion of the envelope is used.

In accordance with another aspect of the present invention, the predistortion circuitry 90 is operable for predistorting the input signal envelope to cause over-compensation in the level of power that is supplied to the amplifier 10 to ensure proper efficient and linear amplification. That is, the predistortion algorithm provided through DSP 92 and predistortion circuit 90 might be configured to create a small margin above the required minimum envelope level at any given instant in time to ensure that the envelope-tracking process provides sufficient power to amplifier 10 so as not to degrade the intermodulation distortion (IMD) performance of the amplifier. In that way, the amplifier 10 is able to handle significant envelope peaks. The present invention thus operates on the realization that the power supply output 62 does not need to precisely follow the input envelope in order to achieve the desired results of the invention. Rather, the output of supply 60 merely needs to "at least" follow the envelope or be slightly above the envelope. While the built-in over-compensation provided by the predistortion circuit 90 may result in a very small and almost negligible loss in efficiency of the overall transmitter 5, it will ensure that adequate IMD performance is guaranteed without significantly adding to the overall system complexity. The IMD performance of the transmitter 5 is also addressed by the conventional predistortion circuitry in the MSP 16, separate and apart from the envelope predistortion provided by the invention.

In an alternative embodiment of the invention, the over-compensation provided by the predistortion circuit 90 might be related to the level of the input signal envelope. In such a case, the predistortion might be tailored according to the envelope level. For example, for low envelope levels, the predistortion circuit 90 might be operable to predistort the envelope so that the predistorted envelope 74 closely tracks the input signal envelope 18. However, for high envelope levels, the predistortion of the envelope by circuit 90 provides overcompensation in the envelope so the amplifier can address the higher input signal levels. In still another alternative, the predistorter circuit might be configured to only predistort the envelope at higher levels above a certain threshold level.

Further discussion and embodiments for providing envelope tracking signal predistortion are set forth in U.S. patent application Ser. No. 11/016,508, entitled "A Transmitter with an Envelope Tracking Power Amplifier Utilizing Digital Predistortion of the Signal Envelope," and filed on Dec. 17, 2004, which application is incorporated herein by reference in its entirety.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed:

1. A transceiver comprising:
    an amplifying circuit for amplifying an input signal to produce an output signal;
    an envelope-tracking power supply operable for varying the level of power that is supplied to the amplifying circuit in response to variation of an input signal envelope directed to the power supply, the envelope-tracking power supply having non-linearities in the transfer function of the power supply;
    a digital signal processing circuit operable for digitally detecting the input signal envelope used by the envelope-tracking power supply to provide the variation of the power supply level to the amplifying circuit;
    the digital signal processing circuit including an envelope predistortion circuit operable for receiving the input signal envelope and predistorting the input signal envelope to address non-linearities in the transfer function of the power supply before the input signal envelope is directed to the power supply;
    the digital signal processing circuit having a main signal path coupled to the amplifying circuit, an envelope tracking path coupled to the envelope-tracking power supply and an input signal path and feedback signal path each coupled to a portion of the envelope predistortion circuit;
    the digital signal processing circuit operable for introducing a digital delay into a signal in at least one of the main signal path, envelope tracking path, input signal path and feedback signal path.

2. The transceiver of claim 1 wherein the digital signal processing circuit is further operable for digitally delaying the signal in the envelope tracking path to time align the power supply level with the input signal.

3. The transceiver of claim 1 wherein the envelope predistortion circuit is adaptable, the digital signal processing circuit further including circuitry for adapting the envelope predistortion circuit based on a signal in at least one of the input signal path and the feedback signal path.

4. The transceiver of claim 1 wherein the digital signal processing circuit includes a main predistortion circuit for digitally predistorting the input signal in the main signal path, the main predistortion circuit including an input signal path and a feedback signal path, the digital signal processing circuit operable for digitally delaying a signal in at least one of the input and feedback signal paths of the main predistortion circuit.

5. The transceiver of claim 4 wherein the main predistortion circuit is adaptable, the digital signal processing circuit including circuitry for adapting the main predistortion circuit based on a signal in at least one of the input signal path and the feedback signal path.

6. A method of amplifying a signal comprising:
    amplifying an input signal in a main signal path with an amplifier to produce an output signal;
    digitally detecting an envelope of the input signal and varying the level of power that is supplied to the amplifier by an envelope-tracking power supply in response to variation of the input signal envelope, the envelope-tracking power supply having non-linearities in the transfer function of the power supply;
    predistorting the input signal envelope in an envelope tracking path with an envelope predistortion circuit to address non-linearities in the transfer function of the power supply before the input signal envelope is directed to the power supply;
    introducing a digital delay into a signal in at least one of the main signal path, the envelope tracking path, or an input signal path or feedback signal path coupled to a portion of the envelope predistortion circuit.

7. The method of claim 6 further comprising digitally delaying the signal in the envelope tracking path to time align the power supply level with the input signal.

8. The method of claim 6 further comprising adapting the envelope predistortion circuit with adapting circuitry based on a signal in at least one of the input signal path and the feedback signal path.

9. The method of claim 6 further comprising predistorting the input signal with a main predistortion circuit, the main predistortion circuit including an input signal path and a feedback signal path and digitally delaying a signal in at least one of the input and feedback signal paths of the main predistortion circuit.

10. The method of claim 9 further comprising adapting the main predistortion circuit with adapting circuitry based on a signal in at least one of the input signal path and the feedback signal path.

* * * * *